United States Patent [19]

Gressier et al.

[11] Patent Number: 5,170,410
[45] Date of Patent: Dec. 8, 1992

[54] DIRECT SEQUENCE SPREAD SPECTRUM DIGITAL COMMUNICATION SYSTEM EMPLOYING SEQUENCE CHANGING DURING TRANSMISSION AND TRANSMITTER AND RECEIVER IMPLEMENTING SAME

[75] Inventors: Alain Gressier; Philippe Sehier, both of Levallois Perret, France

[73] Assignee: Alcatel Transmission Par Faisceaux Hertziens, Levallois Perret Cedex, France

[21] Appl. No.: 721,007

[22] Filed: Jun. 26, 1991

[30] Foreign Application Priority Data

Jun. 28, 1990 [FR] France ................. 90 08179

[51] Int. Cl.$^5$ .......................................... H04K 1/00
[52] U.S. Cl. .................................... 375/1; 380/34; 380/49
[58] Field of Search ................... 375/1; 380/34, 49

[56] References Cited

U.S. PATENT DOCUMENTS

| | | | |
|---|---|---|---|
| 4,285,060 | 8/1981 | Cobb et al. | 375/1 |
| 5,025,452 | 6/1991 | Sohner et al. | 375/1 |
| 5,063,571 | 11/1991 | Vancraeynest | 375/1 |

*Primary Examiner*—Thomas H. Tarcza
*Assistant Examiner*—David Cain
*Attorney, Agent, or Firm*—Sughrue, Mion, Zinn, Macpeak & Seas

[57] ABSTRACT

A digital signal receiver comprises receiver and demodulator means producing from the received signal a succession of complex elements. It produces sequences of successive complex elements consisting of conjugate elements of homologous elements used at the transmitting end. The sequences so used at the receiving end are synchronized to the homologous sequences used at the transmitting end. The complex elements obtained at the output of the demodulator are multiplied by a corresponding sequence of successive complex elements so produced and synchronized. The resultant complex elements appearing during the duration of an information symbol are summed over said duration to produce an estimate of the original information symbols used at the transmitting end. The complex elements obtained at the output of the demodulator are analyzed to identify a marking introduced at the transmitting end. Selector means ae controlled in response to the marking so identified in such a way as to retain the same sequence of conjugate complex elements or to change sequence. Successive sequence changes occur at random times determined by the receiver exclusively by analyzing said markings but in a deterministic order shown intrinsically to the receiver. The marking may consist in the relative values (the same or opposite values) assigned to the first two elements of the sequence for each information symbol.

7 Claims, 2 Drawing Sheets

DIRECT SEQUENCE SPREAD SPECTRUM DIGITAL COMMUNICATION SYSTEM EMPLOYING SEQUENCE CHANGING DURING TRANSMISSION AND TRANSMITTER AND RECEIVER IMPLEMENTING SAME

BACKGROUND OF THE INVENTION

1. Field of the invention

The present invention concerns protected transmission of digital signals, with particular reference to microwave transmission.

2. Description of the prior art

The object of the protection is to make the link resistant to jamming; one well-known protection method is the direct sequence spread spectrum method, to which the invention relates.

This method is described, for example, in "Coherent Spread Spectrum Systems" by Jack K. Holmes, a Wiley-Interscience Publication, John Wiley & Sons, 1982.

Essentially, the method consists in combining the information symbol to be transmitted with a higher information rate pseudo-random sequence known to the transmitter and to the receiver. The converse operation is carried out at the receiving end so as to restore the original information symbols used in the transmission or, at worst, an estimate of said symbols (given that the transmitted message may be degraded by noise and by jamming).

The information symbols are complex symbols obtained by QPSK modulation and therefore comprising a real part and an imaginary part each on one or more bits.

These complex symbols are transmitted as a continuous stream at a information rate $D_s$, as shown in FIG. 1.

The direct sequence spread spectrum process consists in producing at the transmitting end, at the same time as the information symbols, (complex) elements $C_j$, known in the art as "chips", of a recurrent pseudo-random sequence. The information rate $D_c$ of the chips is higher than the information rate $D_s$ of the symbols, the ratio $r = D_c/D_s$ being referred to as the "spread gain" (for convenience, an integer value is usually chosen for r). The complete sequence comprises L chips, in other words a sequence of L/r symbols. Immediately the sequence of chips $C_j$ is completed it is repeated to be combined with the subsequent symbols.

The result of combining the symbols $a_i$ and the chips $C_j$ will be a stream of symbols $s_i$ at the information rate $D_c$ of the chips and this stream modulates the communication transmitter.

The transposition from the information rate $D_s$ to the higher information rate $D_c$ results in a spreading of the transmitted signal spectrum in the frequency domain, in other words the frequency band used is r times wider than the Nyquist band for transmitting the information symbols alone.

This results in:
- increased noise immunity (by a factor approximating the spread gain),
- excellent resistance to jamming, as the effects of jamming are limited to a restricted part of the spectrum, given the spreading of the spectrum, and
- reduced detectability (the same transmitted energy is spread over a wider band and the transmission spectral density is therefore much closer to the noise spectral density).

At the receiving end, the symbols $s_i$ obtained from the output of the demodulator have applied to them the operation which is the converse of that carried out at the transmitting end: to this end, the symbols $s_i$ received at the information rate $D_c$ are multiplied by the conjugates $C_j^*$ of the elements $C_j$ of the sequence used for transmission, also generated at the information rate $D_c$, and r successive results are then summed; this produces at the information rate $D_s = D_c/r$ an estimate of the original information symbols $a_i$ (if there is no noise and no jamming these symbols are restored exactly).

This assumes, of course, that transmission and reception have been synchronized beforehand, so that the times at which the successive symbols start can be recognized.

The decoding process reduces the spread band to its original width and conversely spreads the jamming in a ratio r (the samples of the jamming signal will be multiplied by the conjugates of the elements of the sequence), so that its spectral density is strongly reduced which strongly reduces its disturbing effect.

This system achieves excellent protection against jamming, but it has the drawback that if the same sequence is used all the time there is an increased risk of interception and jamming; this is the case especially if the sequence is generated in a simple way from a small number of basic chips (a PN sequence of length L=1 023 is generated from a key of only 10 bits, for example): it will then be simple for an enemy to reconstitute this sequence and to intercept or jam the link.

Provision is usually made for changing the sequence during transmission to protect against this risk.

Until now, in all the techniques proposed for achieving this aim it has been necessary to advise the receiver of the impending change, either by interrupting the transmission of information and sending a message warning of the sequence change or by using a parallel channel separate to that used to transmit the information proper to transmit the sequence change information to the receiver.

These solutions are costly to implement (requiring an additional channel or a two-way link, management of link interruption, etc), which has so far limited their general adoption for this type of transmission.

One object of the invention is to propose a direct sequence spread spectrum communication system employing sequence changing during transmission which makes it possible, with a simple one-way link, to transmit sequence change information to the receiver during transmission without degrading or interrupting said link at the time of the change.

Another object of the invention is to propose a method of this kind achieving total transparency of the information transmitted, that is to say a method in which the information rate of the information is not modified and in which special symbols interleaved between the information symbols proper are not used to signal the change.

To this end, the invention proposes the use of intrinsic (that is to say, without additional special symbols) marking of the transmitted sequence; the receiver will then identify the type of marking and will take a decision accordingly.

Avoiding the use of special symbols has two advantages:
firstly, it will not be necessary to filter out these special symbols in the stream of information symbols received; this stream can therefore be used as it is, without requiring any special preliminary processing;

secondly, and more importantly, the sequence change can be detected at a very advanced stage of the process (for example: directly after demodulation), enabling immediate response even before the symbols have been decoded and processed).

Thus with a technically simple device and a simple one-way link with no special modifications, it is possible to change sequence immediately, at random times decided on by the transmitter alone, and with no sign on the link (interruption, transmission of parallel signals, etc) giving any warning of an imminent sequence change to any person attempting to intercept the link.

The security of the link will therefore be increased very significantly, and with minimum equipment costs.

SUMMARY OF THE INVENTION

In one aspect, the invention consists in a direct sequence spread spectrum method of transmitting digital signals comprising a stream of complex symbols produced by QPSK modulation, in which method:

at the transmitting end, a pseudo-random sequence of successive complex elements is produced at a given information rate and each is multiplied by a complex information symbol arriving concurrently at a lower information rate to obtain a resultant sequence of complex elements modulating a carrier, at the receiving end, the complex elements obtained at the output of a demodulator are multiplied by a sequence of successive complex elements made up of elements conjugate to homologous elements used at the transmitting end, the transmit and receive sequences having been synchronized beforehand, and over the duration of an information symbol the resulting complex elements are summed to obtain an estimate of the original information symbols used at the transmitting end, at the transmitting end, one or other of two adjacent complex sequences of elements differing only with respect to intrinsic marking is used selectively according to whether the next sequence that will be used will or will not be the same as the current sequence, and at the receiving end, the complex elements obtained at the output of said demodulator are analyzed to identify said marking and a decision is taken to retain the same sequence of conjugate complex elements or to change sequence according to the marking identified, successive changes of sequence occurring at random times determined by the receiver exclusively on the basis of analyzing said markings but in accordance with a deterministic order known intrinsically by the receiver.

The marking is preferably the value assigned to a plurality of predetermined elements of the sequence, said values being chosen in such a way as to maximize the distance between the two types of marking.

There may be two predetermined elements of the sequence for each information symbol. These two predetermined elements of the sequence can have opposite values for the first marking and the same value for the second marking.

To identify the marking it is sufficient to calculate the quadratic sum over the duration of each information symbol of the respective distance of the two successive predetermined elements appearing during said duration and to compare this result with a predetermined threshold.

In other aspects, the invention consists in a transmitter and a receiver of digital signals implementing the above method.

The invention will now be described in more detail with reference to the appended drawings.

DESCRIPTION OF THE INVENTION

Figure 1:
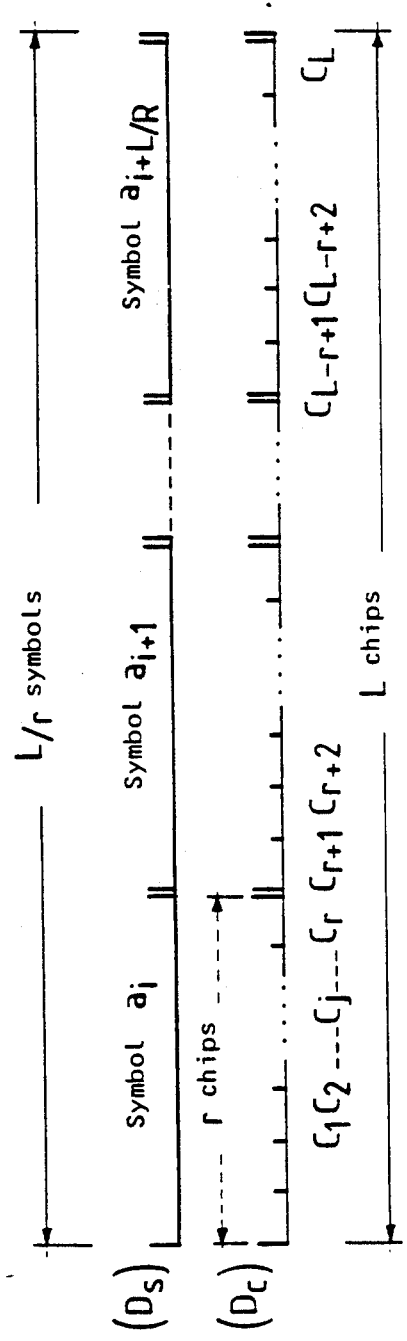
FIG. 1, already referred to, shows how the respective streams of symbols and chips are combined.

Referring to FIG. 1, as already mentioned, for each symbol $a_i$ there are r complex chips $C_j$ each of which will be multiplied by the (complex) value of the respective symbol present at the same time.

Marking in accordance with the invention will entail distinguishing between two cases:

the first case will represent the absence of any sequence change, meaning that the next sequence to be used (after the Lth chip) will be the same as the current sequence;

the second case represents a sequence change after the Lth chip of the current sequence, meaning that the next sequence to be used will not be the same as the current sequence.

This marking can be achieved by altering the value of precisely determined chips for each of the symbols, for example the first two chips $C_1$, $C_2$ of the subsequence of the r chips for the symbol $a_i$, and likewise for all subsequent sub-sequences; in other words, this method operates on the value of all the complex chips $C_{1+i.r}$ and $C_{2+i.r}$ with $i \in \{0, 1 \ldots (L/r)-1\}$.

Note, however, that the choice of the first two chips for each symbol is not limiting on the invention and that it will be equally feasible to choose any two chips or more than two chips, etc. However, as will be explained later, the use of more than two chips introduces the risk of unnecessary alteration of the sequence and therefore reduced efficiency of information transmission.

The second chip for each symbol can be marked by assigning it a value opposite that of the first, so that:

$C_{2+i.r} = -C_{1+i.r}$ in the first case mentioned above, and $C_{2+i.r} = C_{1+i.r}$ in the second case.

This choice has the advantage that in "normal" mode (no sequence change, which is statistically the most frequent case), it is the first marking that will be used for the spectrum spreading and, in its conjugate form, for the despreading: the marking will therefore not reduce the correlation peak at the receiving end.

This peak will be reduced only during the sequence immediately preceding the change: at this time the second marking will have been used for the spreading and the conjugate first marking will have been used for the despreading. If the number of marker chips used is small in comparison with the number of chips per symbol (for example, if only two marker chips are used for a spread gain r=15), the reduction of the correlation peak will be relatively slight and the signal regeneration processing will be able to restore the original symbol without difficulty.

Although the marking mode adopted here (one of the chips is either the opposite of or the copy of another) is not limiting a priori, it is particularly advantageous when it represents the maximum Euclidean distance between the two cases. The maximum distance marking principle minimizes the number of false decisions due to noise and jamming.

The sequence change information is highly redundant, as it is repeated for all the symbols of the same sequence, meaning L/r times; this confers great resistance to noise and jamming (which also facilitates synchronization of detection at the receiving end).

The number of occurrences of the sequence change information can be modified without departing from the scope of the invention; however, it is typically found that r must be at least equal to 10 and that the number of sequence change information occurrences must exceed 50.

Figure 2:
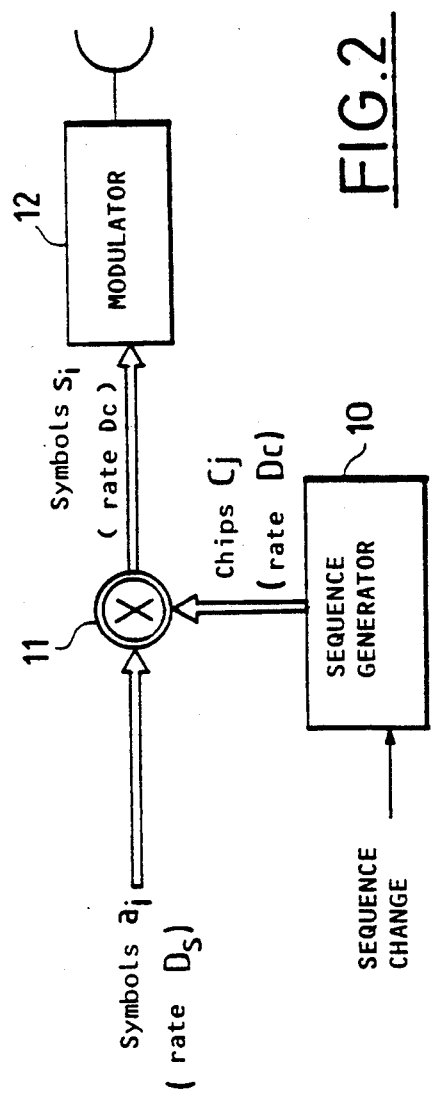
FIG. 2 is a block diagram of a transmitter implementing a method in accordance with the invention.

The transmitter shown in block diagram form in FIG. 2 is of conventional design with a sequence generator 10 applying one of a set of sequences held in memory to a combinational circuit 11 which multiplies it with the symbols to be coded. The output of the circuit 11 provides the digital signal applied to the input of the transmit modulator 12.

A conventional sequence changer transmitter uses a set of q sequences. This transmitter in accordance with the invention uses twice as many (2q) sequences, namely q sequences for the aforementioned first marking and q homologous sequences for the second marking.

Before each change of sequence the transmitter will use a sequence with the second marking and then change to the new sequence.

A "holding time" can be provided if required to allow the receiver to carry out certain actions before the sequence is changed.

In this case, before changing sequence a second marking sequence is used first to advise the receiver of the next sequence change and then one or more similar sequences with the first marking (representing the holding time), after which the new sequence is applied.

The stringing of the sequences is deterministic. The q sequences are strung together in a predefined order, for example a circular loop so that after the sequence $S_p$ the system uses the sequence $S_{f(p)}$ where $f(p) = (p+1)$ module q.

Figure 3:
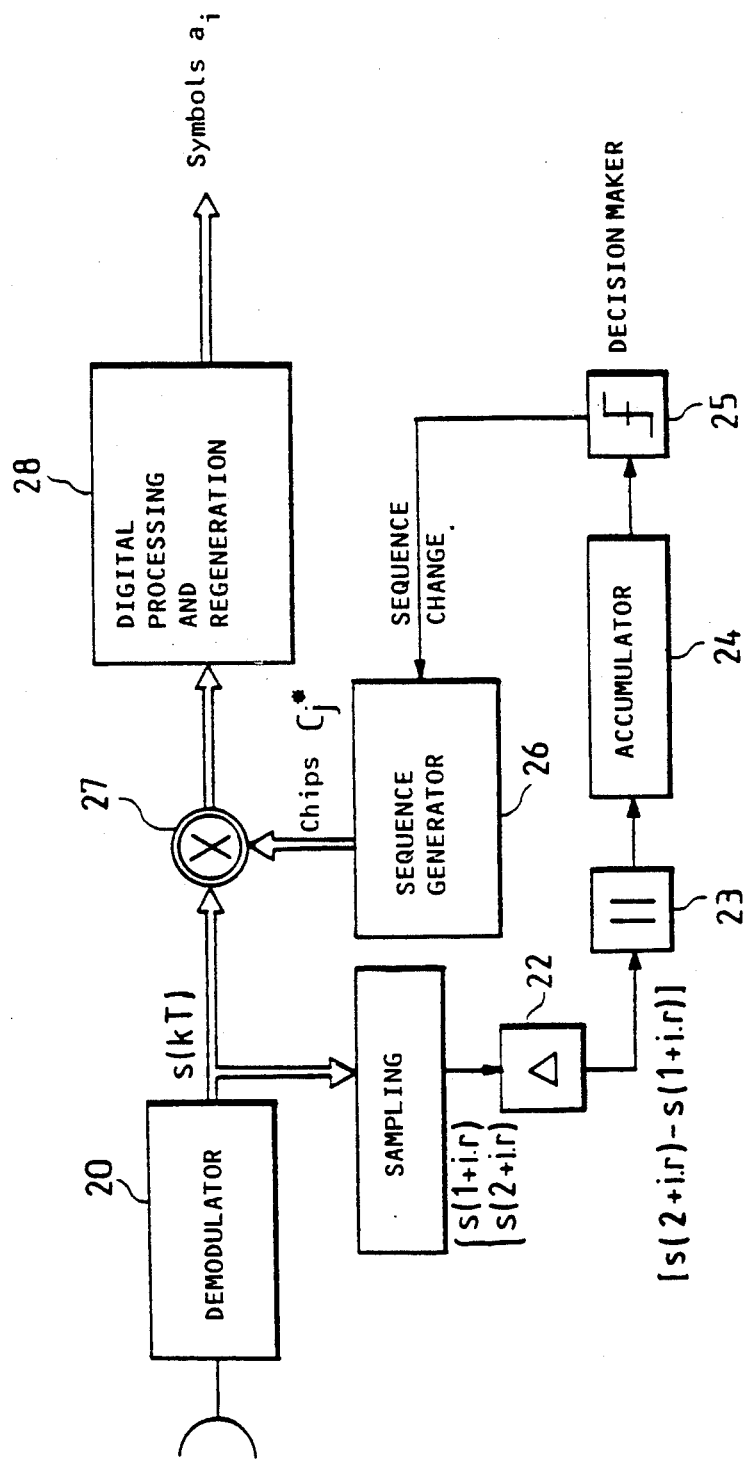
FIG. 3 is a block diagram showing a receiver implementing a method in accordance with the invention.

At the receiving end (FIG. 3) the successive sequential samples received at the information rate $D_c$ at the output of the demodulator 20 are examined. These sequential samples are in the form:

$$s(kT) = \sum_i a_i \cdot \sum_{j=0}^{r-1} C_{i \cdot r + j} (h(kT - (ir + j)T) + N(kT) + J(kT)$$

in which:
T represents the sampling period,
$a_i$ represents the information symbol transmitted,
$C_{i \cdot r + j}$ represents the current chip used for spectrum spreading,
h(t) represents the impulse response of the transmission system as a whole (including all filtering, time-delays, etc),
N(kT) represents the sample resulting from the additive noise, and
J(kT) represents the sample resulting from the jamming transmission.

To identify the marking, the circuit 21 extracts the samples associated only with the marked chips, in other words those for which k takes the values (1+i.r) and (2+i.r).

Differential processing is used to guard against the change of symbol $a_i$ every r chips.

The circuit 22 then calculates the complex difference $s(2+i.r) - s(1+i.r)$ and the circuit 23 then calculates the modulus $|s(2+i.r) - s(1+i.r)|$ of this complex difference.

The accumulator 24 then carries out quadratic summation of the moduli calculated in this way for all the symbols of the same sequence.

This produces an output variable:

$$v = \sum_{i=0}^{(L/r)-1} \|s(2 + i \cdot r) - s(1 + i \cdot r)\|^2$$

which constitutes the variable for deciding to change the coding sequence.

This variable can be written:

$$= \sum_{i=0}^{(L/r)-1} \||s(m+1) - s(m)|\|^2 \quad \text{(where } m = i \cdot r + 1\text{)}$$

$$= \sum_{i=0}^{(L/r)-1} \||a_i \cdot (C_{m+1} - C_m) + (N(m+1) - N(m)) + (J(m+1) - J(m))|\|^2$$

$$= \sum_{i=0}^{(L/r)-1} \||a_i \cdot (C_{m+1} - C_m) + (N(m+1) - N(m)) + (J_0 \cdot (e^{j\Omega(m+1)T} - e^{j\Omega mT}))|\|^2$$

In the above equation, $\Omega$ represents the jamming frequency (assuming a pure carrier jamming transmission and that the intersymbol terms have null values, in other words that $a:h((m-n)T) = \sigma_{mn}$).

This is not the only possible decision variable and the invention is not limited by this choice. For example, if noise resistance were to be given preference over resistance to jamming, a different decision variable offering better performance in this respect could be chosen.

The expected value E[v] of the decision variable v can be weighted as follows, where $N_O$ represents the baseband Gaussian noise power spectral density:

$$E[v] = [1/((L/r) - 1)] \cdot \sum_m \||s(m+1) - s(m)|\|^2 \leq$$

$$\alpha \cdot (E[||(C_{m+1} - C_m)||^2] + 4N_0 + J_0 \cdot 2 \cdot \sin(\Omega T/2))$$

The decision (to change sequence or not) is taken by a circuit 25 which compares E[v] with a threshold representing this weighting.

The circuit 25 commands the change of sequence from the sequence generator 26 which holds a set of g different sequences identical to those held in the generator 10 of the transmitter and which are sequenced according to the same deterministic law.

In a known way, the circuit 27 combines the resulting sequence with the samples s(kT) from the demodulator, the results being then subjected to conventional digital processing, regeneration, etc in the circuit 28.

As an alternative to this, and without departing from the scope of the invention, rather than using the difference between the moduli of the marked samples as the decision criterion, the phase difference of those samples could be used. This approach is less effective against jamming, however.

As another alternative, instead of taking the decision on the output side of the accumulator module 24, in other words pending analysis of the marked samples representing the L/r successive symbols of the same sequence, an intermediate decision could be taken prior to complete summation, in other words based on some only of the marked samples of the sequence (they are all redundant).

There is claimed:

1. A direct sequence spread spectrum method of transmitting digital signals comprising a stream of complex symbols produced by QPSK modulation, in which method:
    at the transmitting end, a pseudo-random sequence of successive complex elements is produced at a given information rate and each is multiplied by a complex information symbol arriving concurrently at a lower information rate to obtain a resultant sequence of complex elements modulating a carrier,
    at the receiving end, the complex elements obtained at the output of a demodulator are multiplied by a sequence of successive complex elements made up of elements conjugate to homologous elements used at the transmitting end, the transmit and receive sequences having been synchronized beforehand, and over the duration of an information symbol the resulting complex elements are summed to obtain an estimate of the original information symbols used at the transmitting end,
    at the transmitting end, one or other of two adjacent complex sequences of elements differing only with respect to intrinsic marking is used selectively according to whether the next sequence that will be used will or will not be the same as the current sequence, and
    at the receiving end, the complex elements obtained at the output of said demodulator are analyzed to identify said marking and a decision is taken to retain the same sequence of conjugate complex elements or to change sequence according to the marking identified, successive changes of sequence occurring at random times determined by the receiver exclusively on the basis of analyzing said markings but in accordance with a deterministic order known intrinsically by the receiver.

2. Method according to claim 1 wherein said marking consists in the value assigned to a plurality of predetermined elements of said sequence, said values being chosen to maximize the distance between the two types of marking.

3. Method according to claim 2 wherein there are two predetermined elements for each information symbol.

4. Method according to claim 3 wherein said two predetermined elements have opposite values in the first marking and the same value in the second marking.

5. Method according to claim 3 wherein, to identify the marking, the quadratic sum is calculated over the duration of each information symbol of the respective distances of two successive predetermined elements appearing during said duration and the result is compared with a predetermined threshold.

6. Digital signal transmitter comprising:
    means for producing a pseudo-random sequence of successive complex elements at a given information rate,
    means for multiplying said successive complex elements by complex information symbols arriving concurrently at a lower information rate to obtain a succession of resultant complex elements,
    modulator and transmitter means fed with the resultant complex elements to produce a QPSK modulated signal from said elements, and
    selector means for using one or other of two adjacent complex element sequences differing from each other only in an intrinsic marking according to whether the next sequence to be used will or will not be the same as the current sequence.

7. Digital signal receiver comprising:
    receiver and demodulator means producing from the received signal a succession of complex elements,
    means for producing sequences of successive complex elements consisting of conjugate elements of homologous elements used at the transmitting end,
    means for synchronizing the sequences so used at the receiving end to the homologous sequences used at the transmitting end,
    means for multiplying the complex elements obtained at the output of the demodulator by a corresponding sequences of successive complex elements so produced and synchronized,
    summing means for summing over the duration of an information symbol the resultant complex elements appearing during said duration to produce an estimate of the original information symbols used at the transmitting end,
    means for analyzing the complex elements obtained at the output of the demodulator to identify a marking introduced at the transmitting end, and
    selector means controlled in response to the marking so identified in such a way as to retain the same sequence of conjugate complex elements or to change sequence, successive sequence changes occurring at random times determined by the receiver exclusively by analyzing said markings but in a deterministic order known intrinsically to the receiver.

* * * * *